United States Patent [19]
Wade

[11] Patent Number: 5,379,406
[45] Date of Patent: Jan. 3, 1995

[54] PERFORMANCE AND MEASUREMENT SYSTEM WHICH LOGS REDUCED DATA PERTAINING TO GROUPS OF PROCESSES

[75] Inventor: Gerald T. Wade, Auburn, Calif.

[73] Assignee: Hewlett-Packard Company, Palo Alto, Calif.

[21] Appl. No.: 178,485

[22] Filed: Jan. 7, 1994

Related U.S. Application Data

[63] Continuation of Ser. No. 793,740, Nov. 18, 1991, abandoned, which is a continuation of Ser. No. 229,573, Aug. 5, 1988, Pat. No. 5,067,107.

[51] Int. Cl.⁶ ............................................. G06F 11/34
[52] U.S. Cl. ................................. 395/500; 364/264.7; 364/260.9; 364/280; 364/264; 364/DIG.1
[58] Field of Search ................... 395/575, 800, 500

[56] References Cited

U.S. PATENT DOCUMENTS

| | | | |
|---|---|---|---|
| 4,507,751 | 3/1985 | Gawlick | 395/575 |
| 4,878,167 | 10/1989 | Kapulka | 395/575 |
| 5,062,055 | 10/1991 | Chinnaswamy | 364/513 |

*Primary Examiner*—Eric Coleman

[57] ABSTRACT

A performance and measurement system can be used to evaluate a computing system. An operating system of the computing system produces performance data about individual processes running on the computing system. The performance data is collected and reduced by combining selected data from the performance data into standardized metrics to produce collected and reduced performance data. The collected and reduced performance data pertains to groups of the individual processes. The collected and reduced performance data is logged into at least one data file. The performance data is discarded.

8 Claims, 2 Drawing Sheets

PERFORMANCE AND MEASUREMENT SYSTEM WHICH LOGS REDUCED DATA PERTAINING TO GROUPS OF PROCESSES

This application is a continuation of co-pending application Ser. No. 07/793,740, filed Nov. 18, 1991, now abandoned, which was a continuation of co-pending application Ser. No. 07/229,573 filed Aug. 5, 1988, which issued as U.S. Pat. No. 5,067,107 on Nov. 19, 1991.

BACKGROUND

The present invention relates to the measurement of computer performance.

Performance tools are used to measure the performance of a computer. The performance of a computer may be evaluated for a variety of purposes. For instance, it may be desired to make a "quick scan" of a computer system. What is meant by a quick scan is an examination of what is currently happening on the computer system in "real time" A quick scan may be done, for instance, when system performance is poor and it is desired to identify which processes are utilizing which computer resources and thus causing the poor performance.

Alternately, a determination of the "state of the system" may be done in order to evaluate the total resource utilization of the system. Such a determination may be done to discover which resources cause slow downs or bottlenecks in system performance. Once identified these resources may be upgraded to improve system performance.

Another reason for evaluating computer performance may be for "application tuning", that is to focus on a particular user application or situation to determine how to improve system performance as regards that particular application or situation.

Finally, performance tools may be used for "trouble shooting", that is determining why system performance degrades for no immediately apparent reason.

In the prior art, performance tools have been written for sophisticated computer technicians to aid in trouble shooting. The general philosophy has been the more data that is generated the better. When these performance tools have been adapted for other uses such as for quick scans, determination of the state of the system or for application tuning, the performance tools have generated too much information. This information is often incomprehensible to the average computer user.

In some system attempts have been made to arrange and to present gathered data in some form which may be deciphered by a user. However, such systems have not proved practical for gathering and presenting data for system performance over a long period of time. This is because the programs typically log an immense amount of information, before the information is later reduced. The memory resources required for such data logging are inordinate. A typical prior art performance system may log one hundred twenty million bytes in a typical twenty-four hour period. Not only is this burdensome on memory resources, but it also takes a lot of processing power to generate this information and then to manipulate the this data into a form which is useful to a user.

SUMMARY OF THE INVENTION

In accordance with the preferred embodiments of the present invention a performance and measurement system for a computing system is presented. Performance data produced by the computing system is collected and reduced before being logged. Once the data is logged, the data may be transported to a workstation and accessed by a user.

In the preferred embodiment, the collected and reduced data is logged into three files. The first file is a global data file into which is logged information about the computing system as a whole. The second file is a process data file into which is logged information about selected processes. The third file is a workload data file into which is logged information about classes of processes.

Information about processes are logged into the process data file when a process does something "interesting" during a specified interval. For example, a process may be considered to have done something interesting when the process is started, is terminated or uses a predetermined amount of a computing system resource during the specified interval.

Data volume is reduced by combining available system performance numbers into standard metrics (See Appendix B for examples of standard metrics). By performing this reduction prior to logging the data, significant savings in log file space are achieved. Contrary to expectations, the pre-reduction of data before logging results in less overhead than that which is required to log the data without pre-reduction. Choice of standard performance metrics may be made so that they are understandable to a user and not specific to a particular computing system.

By selecting to log information only about "interesting" processes, the amount of information logged also is greatly reduced. Since many of a system's processes are dormant or almost dormant at any one time, logged information about these processes would be of little interest when studying the performance of a computing system.

DESCRIPTION OF THE PREFERRED EMBODIMENT

Figure 1:
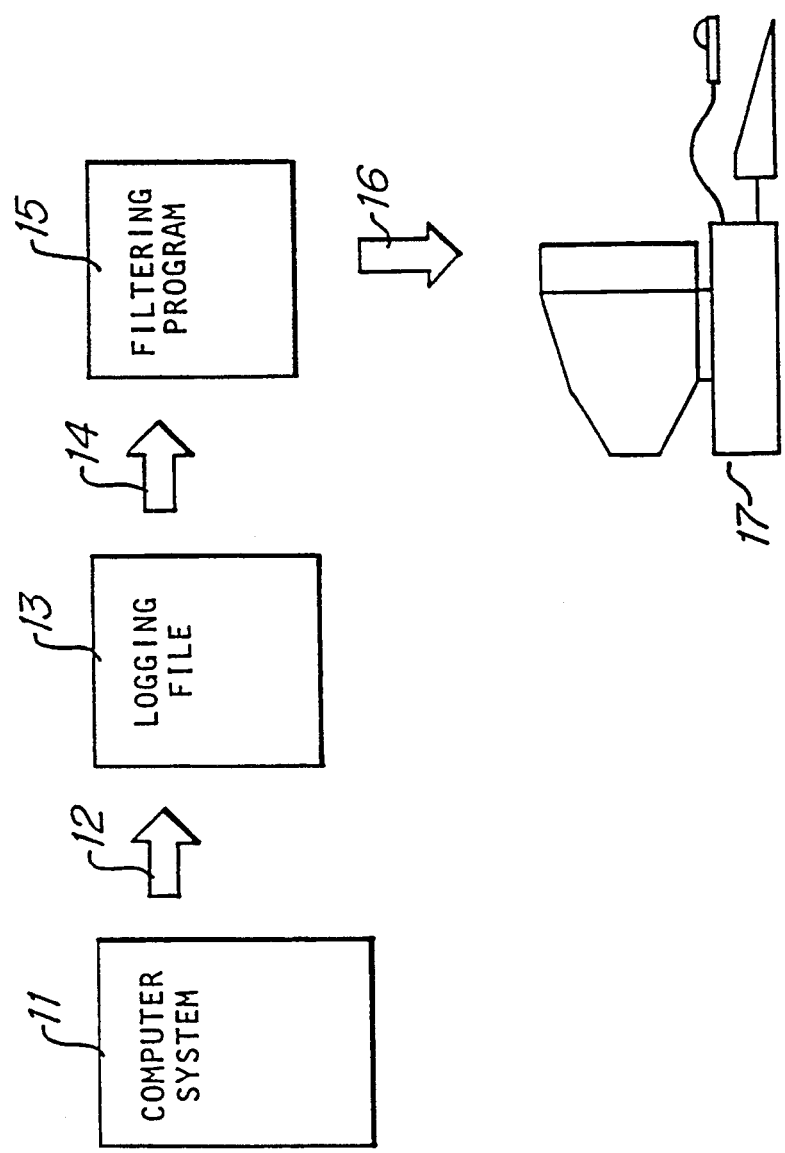
FIG. 1 is a block diagram representation of typical prior system used for evaluating computer performance.

In FIG. 1 a block diagram of a typical prior art computer performance system is shown. A computer system 11 produces performance data 12 which is logged in a logging file 13. When a user wishes to examine system performance, data 14 is transferred from logging file 13 to a filtering program 15. Filtering program 15 arranges the data in a prescribed format and forwards filtered data 16 to a user workstation 17 for evaluation by the user.

Figure 2:
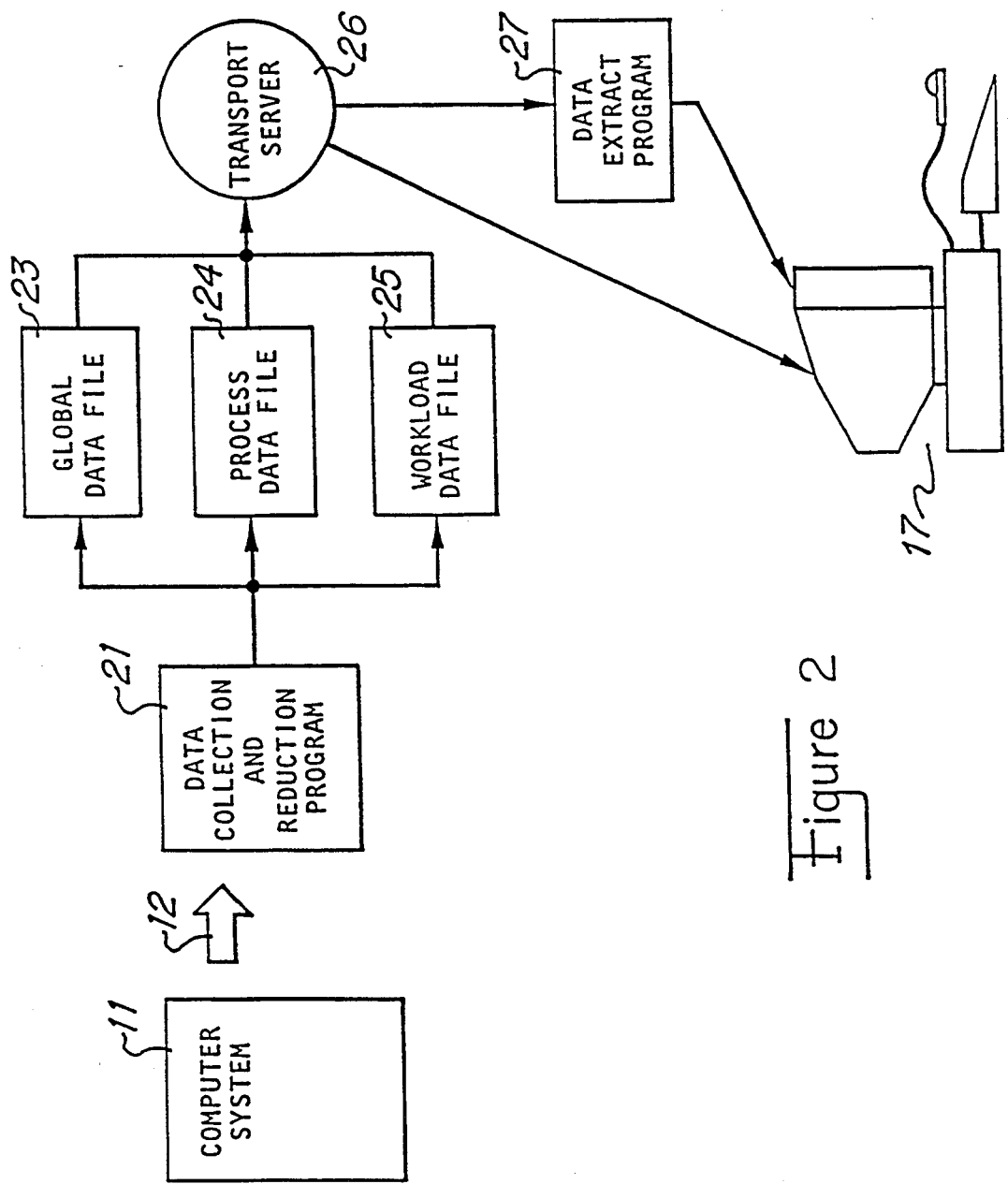
FIG. 2 is a block diagram of a system for computer performance measurement and ev-aluation in accordance with the preferred embodiment of the present invention.

FIG. 2 shows a computer performance measurement and evaluation system in accordance with the preferred embodiment of the present invention. Computer system 11 is again shown producing performance data 12. This information is selectively collected and reduced to standard metrics by data collection and reduction program 21. For an example of standard metrics see Appendix B.

The most commonly used techniques for producing performance data are (1) Sampling, (2) Tracing and (3) Counting. When sampling takes place, computing system 11 is periodically interrupted and the current status of the system is determined. This provides snapshots of the system which may be statistically analyzed to evaluate the system performance.

Tracing is done by the insertion of code into the operating system of computing system 11 which causes the recording of key events. Typically each record of a key event will include a time stamp showing precisely when the event occurred. For example, if the initialization of a process and the termination of a process are recorded as key events, it is possible to determine how long the process was running.

Counting is done by the insertion of code into the operating system, much like tracing. The difference is that the inserted code increments a pre-defined accumulator or accumulates elapsed time into such an accumulator each time an event occurs, rather than recording the event itself.

Data collection and reduction program 21 receives the produced data 12 and will reduce the data before any logging takes place. Program 21 groups the reduced data into three groups and logs different details for each group. The first group is global data logged in global data file 23. The second group is process data logged in process data file 24. The third group is workload data logged in workload data file 25.

Global data in global data file 23 consists of global data records of standard metrics which report system performance on computing system 11 as a whole. Records are added to this file, for example, at the rate of one every five minutes.

Process data in process data file 24 consists of process data records of standard metrics which contains information on any process which is found to be "interesting" during a specified interval. Specified interval is, for example, one minute. Records are typically added to process data file 24 at the end of each specified interval. A process is found to be "interesting" when it meets any one (or more) of the following criteria:

A process is seen for the first time, i.e., it is started.

A process ceases to run, i.e., it is terminated.

A process uses more of a given resource than a user defined threshold value. For instance, thresholds may be set for (1) central processing unit (CPU) usage, (2) amount a disc drive is accessed, (3) amount of transactions with a terminal and (4) the amount of response time between the process and a terminal.

Workload data in workload data file 25 consists of records containing information for any user defined grouping or processes. Such a grouping is called a "class". For example, information about a class may be logged once every five minutes when at least one process within the class consumes some CPU time during the five minutes. An extensive level of detail may be logged about a class of processes where it would be impractical to log such a level of detail for each process.

In the preferred embodiment, a user may specify whether to log global, process and workload data independently or in any combination. A user also may set the amount of disc space the user is willing to consume to hold data of each type. Global data file 23, process data file 24 and workload data file 25 are "circular", that is when each file is filled new data overwrites the oldest data in the file.

Table 1 below presents a "pseudo code" version of data collection and reduction program 21.

TABLE 1

INITIALIZE (Verify execution environment and initialize counters)
  (Open global data file 23, process data file 24, workload data file 25)
READ USER DEFINABLE PARAMETERS (System Identification, Thresholds, Application Definitions)
BEGIN (Continuous Loop)
  GATHER SYSTEM GLOBAL INFORMATION (From Operating System)
  COMBINE RAW GLOBAL DATA INTO STANDARD GLOBAL METRICS
  BEGIN (For each potential Process)
    GATHER PROCESS INFORMATION (From Operating System)
    ACCUMULATE PROCESS INFORMATION INTO STANDARD GLOBAL METRICS
    IF THIS IS A NEW PROCESS THEN
      MARK THE PROCESS AS "INTERESTING"
      DETERMINE APPLICATION # FROM USER DEFINITIONS
    IF THIS PROCESS JUST TERMINATED THEN
      MARK THE PROCESS AS "INTERESTING"
    IF THIS PROCESS EXCEEDED ANY USER DEFINED THRESHOLDS
      (CPU%, DISC IO RATE, TRANSACTION RATE, RESPONSE TIME)
      MARK THE PROCESS AS "INTERESTING
    ACCUMULATE PROCESS INFORMATION
      INTO CORRESPONDING APPLICATION'S STANDARD
      METRICS AND MARK THE APPLICATION AS "ACTIVE"
    IF THE PROCESS IS MARKED "INTERESTING" THEN
      COMBINE RAW PROCESS DATA INTO STANDARD PROCESS METRICS
      LOG THE PROCESS METRICS INTO process data file 24.
  END
  IF THE DESIRED GLOBAL INTERVAL HAS PASSED THEN
    LOG THE GLOBAL METRICS INTO global data file 23.
  FOR EACH USER DEFINED APPLICATION
    IF APPLICATION IS MARKED AS "ACTIVE" THEN
      LOG THE APPLICATION METRICS INTO workload data file 25.
      INITIALIZE APPLICATION COUNTERS
  PAUSE UNTIL TIME TO COLLECT NEXT DATA
END In order to present the collected data to a user, it is necessary to transport the data from files 23, 24 and 25 to user workstation 17. This may be done by a transport server 26. Transport server 26 may deliver the data to user workstation 17, for instance by a local area network (LAN) or an RS-232 data communication link. A data extract program 27 may be used to extract data from computers on a network which user workstation is not directly a part of.

Appendix A contains a description of a user interface for the computer performance and evaluation system of FIG. 2.

Appendix B contains an listing of standard performance metrics which may be logged into global data file 23, process data file 24 and workload data file 25.

APPENDIX A

SCOPE Performance Metrics

The majority of the performance information is obtained from the MPE Measurement Interface. This interface can be enabled at any combination of "levels". The SCOPE package would enable three levels, GLOBAL, PROCESS, and IO STATISTICS, (class 0, 15, and 14). Information may come from other sources in some cases. (Disc utilization percentages, for example, are obtained by directly sampling the Device Information Table entries. Much of the process identifying information in the Process Log file is obtained by calling the JOBINFO intrinsic).

Regardless of their source, the metrics chosen should be able to be maintained across operating system changes and should help to insulate the end user from many of the internal structures and their changes.

The following General Metrics would be included in all log file records:

GENERAL Metrics

| | |
|---|---|
| RECORD TYPE | (A unique number to identify the content and format for this record. This allows mixing different log record types into the same log file if desired). |
| DATE | (The date (YEAR & Julian DAY) when the log record was generated.). |
| TIME | (The time (HOUR, MINUTE, SECOND, Tenth of a second) ). |
| INTERVAL | (The time interval covered by the record (in seconds)). |
| SAMPLES | (The number of individual samples which were averaged into this record). |

CPU Metrics

| | |
|---|---|
| CPU BUSY (SYSTEM) | (From the PROCESS level statistics. Obtained by accumulating all the CPU TIME from any SYSTEM process which was active during the interval). |
| CPU BUSY (SESSION) | (From the PROCESS level statistics. Obtained by accumulating all the CPU TIME from any SESSION (interactive) process which was active during the interval). |
| CPU BUSY (BATCH) | (From the PROCESS level statistics. Obtained by accumulating all the CPU TIME from any JOB (batch) process which was active during the interval). |
| CPU MAM | (From the GLOBAL statistics, cpu for Memory Manager plus Local Garbage Collection) |
| CPU CACHE | (From the GLOBAL statistics, CPU for disc caching on the ICS) |
| CPU CACHE on PROCESS | (From the GLOBAL statistics, CPU for disc caching on PROCESSes stacks. This time is separated from CPU CACHE because it is doubly counted, once here, and again for the process on whose stack it ran. If you want to know how much CPU CACHING was using, add CPU CACHE + CPU CACHEonPROCS. If you want to determine where the CPU was spending its time (i.e. account for 100% of the CPU's cycles) then don't add CPU CACHEonPROCS to CPU BUSY or you'll count it double). See below for the counters which should add to 100%. |

| | |
|---|---|
| CPU PAUSED | (From the GLOBAL statistics. The amount of time the CPU was paused (not executing any process or system code) and Disc IO was occurring.<br><br>Add Paused for Disc<br>+ Paused for Swap<br>+ Paused for Disc or Swap<br>+ Paused for Cache |
| CPU IDLE | From the GLOBAL statistics. The amount of time when the CPU was not processing any process or system code and NO DISC IO was occurring. Add Idle Time + Background Garbage Collection (Pseudo idle time) |
| CPU OTHER | (Calculated from the other CPU conditions.<br><br>SUBTRACT from 100%<br>   CPU BUSY (SYSTEM+SESSION+BATCH)<br>   CPU MAM<br>   CPU CACHE<br>   CPU PAUSED<br>   CPU IDLE<br><br>This represents all the "unaccounted for" CPU time. Normally most of this time is overhead handling interrupts on the ICS but other activities may be included). |

NOTE: Since this is a calculated quantity, it is designed so that adding it to the other values in the previous list will ALWAYS equal 100%. This is true most of the time. It has been noted that due to data being collected at slightly different times in the measurement interface, CPU OTHER may occasionally be a negative number. (I have only observed it going to -2%). In order to make life easier for the data reduction programs, CPU OTHER will never be allowed to go negative (it will be set to zero instead). No warning will be issued when this occurs.

CPU BUSY + CPU MAM + CPU CACHE + CPU PAUSED + CPU IDLE + CPU OTHER should always equal or approximate 100%.

Global DISC Metrics

In the GLOBAL Log file, there would be one counter for each of the following metrics for each configured disc device on the system (max of 32 discs are allowed). In addition, a combined total for all discs will be maintained to indicate overall disc IO rates and utilization.

DISC Metrics

| | |
|---|---|
| LOGICAL READS | (From the IOSTAT statistics. Count all Logical Reads plus all Physical Reads for non cache (i.e. PIN<>0) processes). |
| LOGICAL WRITES | (From the IOSTAT statistics. Count all Logical Writes plus all Physical Writes for non cache (i.e. PIN<>0) processes). |
| PHYSICAL READS | (From the GLOBAL DISC Statistics. Add the following counters for each disc drive:<br><br>   BLOCKED READS<br>   UNBLOCKED READS<br>   UNBLOCKED READS AWAKE<br>   CACHE READ ACCESS |

| | |
|---|---|
| PHYSICAL WRITES | (From the GLOBAL DISC Statistics. Add the following counters for each disc drive: <br><br> BLOCKED WRITES <br> UNBLOCKED WRITES <br> UNBLOCKED WRITES AWAKE <br> CACHE BACKGROUND WRITES <br> CACHE FORCED WRITES |
| MAM READS | (Disc READS done by the MEMORY MANAGER. From the GLOBAL DISC Statistics. For each disc, add the number of <br><br> CODE SEGMENT READS <br> DATA SEGMENT READS |
| MAM WRITES | (Disc WRITES done by the MEMORY MANAGER. From the GLOBAL DISC Statistics. For each disc, add the number of <br><br> BACKGROUND DATA SEGMENT WRITES <br> FORCED DATA SEGMENT WRITES |
| DISC DEVICE UTILIZATION | (For each disc drive which is configured on the system, the percent of time when an IO operation was active. This value will be obtained by sampling the device information table for all discs (approximately once each second) and recording the number of times the disc showed active IO versus the total number of samples taken). |
| SYSTEM PROCESS DISC RATE | (The overall physical disc IO rate for all MPE (system) processes. This rate would not include memory manager or disc caching IOs but would be for any process which does not belong to a JOB or SESSION. Examples of system processes are SPOOLERS, Data Comm Monitors like DSMONX, and DSCOPY). |
| SESSION PROCESS DISC RATE | (The overall physical disc IO rate for all processes belonging to interactive sessions. This includes the disc IOs done by disc caching as a direct result of a session process logical IOs and any user physical IOs. User Physical IOs can occur to an uncached disc drive or by running programs that bypass disc caching (like STORE/RESTORE)). |
| BATCH PROCESS DISC RATE | (The overall physical disc IO rate for all processes belonging to batch jobs). |

Global TRANSACTION Metrics

The following metrics are averages (means) for all terminal transactions which occurred on the system. A terminal transaction consists of one or more writes to a terminal followed by a read to that terminal. The exact method for calculating response times is described later in this document. The timings for these metrics are obtained from the IO trace facility of the Measurement Interface which timestamps the completion of all IOs on the system.

TRANSACTION Metrics

| | |
|---|---|
| TRANSACTIONS | (The total number of terminal transactions completed in the sample interval). |

| AVERAGE THINK TIME | (The mean think time for all terminal transactions completed in the sample interval. Units are time per transaction). |
|---|---|
| AVERAGE FIRST RESPONSE | (The mean time from completing a terminal read until completing the first write to that same terminal. Units are time per transaction). |
| AVERAGE RESPONSE | (The mean time from completing a terminal read until completing the last write, preceding the next read to that same terminal. Units are time per transaction). |

In addition to the mean for these metrics, some measure is needed to indicate how the individual transactions were distributed about these means. Various metrics have been used for this purpose including the Range (difference between the minimum and maximum), Standard Deviation (Square root of the sum of squares of the difference between each point and the mean, divided by one less than the number of data points), Coefficient of Variation (The Standard Deviation divided by the mean) and probably many more. Since the mean is know, knowing either the Standard Deviation or the Coefficient of Variation means you can easily calculate the other. Since Coefficients of variation are useful for comparing variability in different types of measures, SCOPE will use them. General guidelines for interpreting the Coefficient of Variability are:

- A smaller coefficient indicates that there is less variability in the sample. For example, a coefficient of 0.1 on response times would indicate very uniform responses as opposed to a sample with a coefficient of 10.0.

- The expected distribution for terminal transactions is 1.0. Much lower values indicate an abnormally regular transaction. Much higher values indicate an abnormally irregular transaction (and perhaps user perceived "ragged" responses).

| COEFFICIENT OF VARIATION FOR THINK TIMES | (The coefficient of variation for this sampling of transaction think times). |
|---|---|
| COEFFICIENT OF VARIATION FOR FIRST RESPONSE | (The coefficient of variation for this sampling of transaction times to first response). |
| COEFFICIENT OF VARIATION FOR RESPONSE | (The coefficient of variation for this sampling of transaction response times (From terminal read to last write [prompt])). |

NOTE

Remember, if you want the Standard Deviation for any particular transaction metric, you can get it by multiplying the appropriate Coefficient of Variation by its corresponding Average (mean).

Global PROCESS Metrics

PROCESS Metrics

| JOBS COMPLETED | The number of batch jobs which terminated during the last interval. |
|---|---|
| SESSIONS COMPLETED | The total number of interactive sessions which completed in the last interval. |

| | |
|---|---|
| COMPLETED JOB ELAPSED TIMES | The average elapsed time for all batch jobs which completed in the last interval. |
| COMPLETED SESSION ELAPSED TIMES | The average elapsed time for all interactive sessions which terminated in the last interval. |
| COMPLETED BATCH PROCESSES | The number of batch processes which terminated during the last interval. |
| COMPLETED SESSION PROCESSES | The number of interactive processes which terminated during the last interval. |
| COMPLETED BATCH PROCESS ELAPSED TIMES | The average elapsed time for all batch processes which terminated during the last interval. |
| COMPLETED SESSION PROCESS ELAPSED TIMES | The average elapsed time for all interactive processes which terminated during the last interval. |

Three special cases of the WORKLOAD metrics (defined later) are generated automatically and logged into the GLOBAL log file. They are defined, not by the program name as are standard classes, but rather by the process TYPE:

SYSTEM (Job/Session number indicates type=0 or 3)
SESSION (Job/Session number indicated type=1)
JOB    (Job/Session number indicated type=2)

All information collected for user defined classes is also collected for these special cases with the following exceptions:

```
CLASS NUMBER   always = 0
CLASS NAME     will be SYSTEM PROCESSES, SESSION PROCESSES,
               or BATCH PROCESSES
QUEUE          will be 'LL' for SYSTEM (regardless of actual queue)
               'CS' for SESSION ( " )
               'DS' for BATCH   ( " )
```

Terminal Response Times

Terminal response times are obtained from the Measurement Interface IO Statistics. This measurement class (14) captures individual IO requests and time stamps them. By examining these IO completion entries and extracting those to terminal type devices (including Multipoint terminals and DS pseudo terminals) the following metrics can be obtained.

(For DS and MTS terminals, these measurements do not include any overhead or queuing times associated with the data comm product).

| | |
|---|---|
| USER THINK TIME | This is the time between the completion of the write immediately preceding a read on a terminal and the completion of that read. |
| TIME TO FIRST RESPONSE | This is the time between completing a read from a terminal and the completion of the next write to that terminal. |
| TIME TO PROMPT | This is the time between completing a read from a terminal and the completion of the last write preceding the next read to that terminal. |

NOTE: Special filtering will be done to eliminate any terminal status requests where the terminal is sending data automatically. This is accomplished by not counting a terminal read as a transaction delimiter if the user think time is less than a given value (now set to 100 milliseconds).

At the GLOBAL level, Think time, First Response time, and Response time values are sorted into user definable "buckets" (up to 10). Each bucket contains the number of transactions which had this metric fall in the range of values selected by the user. For example:

If the user specifies Response Time buckets of .5,1,2,3,4,5,10,20,40 then the bucket values would be:

```
RESPONSE(1)  = 0.0 to 0.4 seconds
RESPONSE(2)  = 0.5 to 0.9 seconds
RESPONSE(3)  = 1.0 to 1.9 seconds
RESPONSE(4)  = 2.0 to 2.9 seconds
RESPONSE(5)  = 3.0 to 3.9 seconds
RESPONSE(6)  = 4.0 to 4.9 seconds
RESPONSE(7)  = 5.0 to 9.9 seconds
RESPONSE(8)  = 10.0 to 19.9 seconds
RESPONSE(9)  = 20.0 to 39.9 seconds
RESPONSE(10) = 40.0 seconds and above
```

Different buckets are allowed for each metric.

At all other levels, Think time, First Response time, and Response time values are a single number which represents the average (mean) over the time interval.

WORKLOADS Metrics

A "Workload" is used to indicate all the activity taking place on the system. This activity is broken down into individual "Classes". A "class" is a collection of similiar or related processes. This grouping can be either by process type (System, Session or Batch as described in the Globals section) or by program names. Users of the SCOPE package can configure up to 18 classes. For each class, the following metrics are collected:

| | |
|---|---|
| CLASS NUMBER | A sequentially assigned number for each class. SCOPE reserves class numbers 0 (SYSTEM/SESSION/BATCH) and 1 (OTHER=all processes NOT defined under user classes) so the range of user defined class numbers is 2-19. |
| CLASS NAME | A twenty character identifier for the class, assigned by the user. |
| QUEUE | A two character mnemonic denoting the execution priority queue for this class. (All user defined classes will automatically be separated by execution priority queue). The values this metric can assume are:<br><br>'LL' In the LINEAR QUEUE ('BS' or PM GETPRIORITY).<br>'CS' In the C subqueue<br>'DS' In the D subqueue<br>'ES' In the E subqueue<br><br>If a process changes execution queues, dynamically, then it will move to the appropriate class as it does so. (i.e. SCOPE will "follow" a process as it changes execution priority queues). |
| NUMBER OF PROCESSES | Average number of processes which were in this class during the sampling interval. |

| | |
|---|---|
| COMPLETED PROCESSES | The number of processes belonging to this class which terminated during the last interval. |
| COMPLETED PROCESS ELAPSED TIMES | The average elapsed time for all processes which terminated in this class over the last interval. |
| ACTIVE | Average number of processes which were active (consumed CPU) during the interval. |
| CPU | Percent of total CPU time (a component of CPU BUSY) |
| TRANSACTIONS | The number of terminal transactions completed. (This metric uses the same filtering as described above to eliminate terminal status requests from the transaction count). |
| THINK TIME | The average user think time between terminal transactions for all processes in this class |
| FIRST RESPONSE | The average time to first response for all processes in this class. |
| RESPONSE | The average time to prompt for all processes in this class. |
| COEFFICIENT OF VARIATION FOR THINK TIMES | See the discussion of Coefficients of Variation in the Global Metrics section of this chapter. For classes, only transactions completed by processes which belong in this class are included in the statistic. |
| COEFFICIENT OF VARIATION FOR FIRST RESPONSE | (See above) |
| COEFFICIENT OF VARIATION FOR RESPONSE | (See above) |
| DISC READS | # of reads done to each configured disc device. (Logical reads if disc caching is enabled). |
| DISC WRITES | # of writes done to each configured disc device. (This is independent of caching on MPE/V since logical writes also result in physical writes). |
| DISC PHYSICAL READS | # of physical reads to each configured disc device. ( Physical include all IOs which were done by disc caching as a direct result of a user Logical IO plus any user direct physical IOs). |

NOTE

Under MPE/V every logical disc write will result in a physical disc write so it is not necessary to maintain a physical disc write metric separately.

PROCESS Level Log File

Any process which has been identified as "interesting" by either being born, dying, or crossing some metric threshold (such as exceeding a given percent of CPU usage or getting a given response time for a certain interval) will generate a record to a special process log file. The following metrics are divided into three categories. The Process Identification Metrics contain information about the process which never or rarely change throughout the life of the process. Process Interval Metrics contain details about the process during the last sample interval. Process Overall Metrics contain details about the process over the entire life time of that process. The Overall Metrics may be used to determine what the process was doing during any times it was NOT "interesting".

Process Identification Metrics

| | |
|---|---|
| PIN | Process identification number which can be used to correlate this process with data from other performance tools. |
| INTER/BATCH PRIORITY | This is a two byte field. The first byte is "I" for interactive processes, "B" for batch processes or " " (blank) for system processes. |
| | The second byte is "L", "C", "D", or "E" depending on which execution queue the process is running in (Linear, CS, DS, or ES). |
| JOB or SESSION NUMBER | This is the job or session number assigned to the process when the job or session logged on. It will be zero for system processes. |
| PROGRAM NAME | The name of the program being executed, and the group and account in which it resides. |
| CLASS | The number of the class to which this process is being logged. |
| USER LOGON | The JOB/SESSION NAME, USER, ACCOUNT and GROUP used when the job or session logged onto the system |
| LOGON DEVICE | Terminal device (for sessions) or batch input device for the job/session's standard in file. |

Process Interval Metrics

| | |
|---|---|
| REASON FOR INTEREST | An indicator of why the process is being logged. (for example, it is a new process, it has terminated, it crossed the CPU threshold, etc.). If a process was "interesting" for more than one reason, then all applicable reasons are preserved. |
| EXECUTION PRIORITY | The absolute execution priority of the process within the execution subqueue, (a number from 0 to 255, highest to lowest). |
| CI COMMAND | Only if the process being logged is an MPE Command Interpreter (CI). The first 23 bytes of the last command processed will be given instead of the full program name. |
| NUMBER OF TRANSACTIONS | For interactive processes, the number of terminal transactions processed in the last time interval. |
| USER THINK TIME | The average think time for the processes transactions over the last time interval. |
| TIME TO FIRST RESPONSE | The average time to first response over the last time interval. |
| TIME TO PROMPT | Average time to prompt over the last time interval |
| CPU | The percent of CPU time consumed during the last interval. |

| | |
|---|---|
| DISC READS | The number of logical disc reads done during the last interval |
| DISC WRITES | The number of disc writes done during the last interval. |
| DISC PHYSICAL READS | The number of physical disc reads done during the last interval. |
| STOP REASON | A code to indicate the reason why the process is currently not executing. This code relates to one of the STOP metrics in the Overall Metrics. |

Process Overall Metrics

| | |
|---|---|
| PROCESS RUN TIME | The number of seconds this process has been running. |
| OVERALL CPU | This is the average amount of CPU time consumed by the process over its life. |
| OVERALL DISC IO RATE | This is the logical disc IO rate over the entire life of the process. It is reads and writes combined and unlike the previous metrics, does not refer to just the last interval. It is useful when determining the overall disc IO requirements for a process which might not have always been "interesting". |
| OVERALL TRANSACTION RATE | The number or rate of terminal transactions over the life of a process. |
| OVERALL THINK TIME | The average think time for all transactions over the life of a process. |
| OVERALL FIRST RESPONSE | The average time to first response over the life of a process. |
| OVERALL RESPONSE TIME | The average time to prompt over the life of a process. |
| STOPPED FOR SWAP | The percentage of time this process has been stopped waiting for a memory swap to occur since it first started. |
| STOPPED FOR DISC | The percentage of time this process has been stopped waiting for a user type (non swap) disc IO to occur. |
| STOPPED FOR TERMINAL | The percentage of time this process has been stopped waiting on a terminal read (i.e. a USER to enter input). |
| STOPPED FOR IO | The percentage of time this process has been stopped waiting for an IO other than DISC or TERMINAL read to occur. |
| STOPPED FOR IMPEDE | The percentage of time this process has been impeded from executing by any of several mechanisms such as file or data base queuing etc. |
| STOPPED FOR PREEMPT | This is the percentage of time a process was ready to run, but had the CPU taken away by a higher priority process. |

NOTE

Not all reasons for stopping a process are currently logged. That means it is common to add all stop percentages and arrive at less than 100%. The other time is spent stopped for some other (unlogged) reason.

HEADER Information

Each time the SCOPE data collection tool is started, it will log its run time format into the log files. This information is formatted into special "header" record types and includes the following information:

HEADER Metrics

| | |
|---|---|
| DATE | DATE (Year and Julian DAY) when SCOPE was started |
| TIME | TIME (Hour, Minute, Second, tenth of second) when SCOPE was started |
| INTERVAL | The sample rate specified (in seconds) for GLOBAL & CLASS logging. |
| VUF | The SCOPE program name 'SCOPE', Version, Update, and Fix levels. |
| SYSTEM ID | Any user specified system identification information. (Up to 40 characters of ASCII information). |
| LOG EVENTS | An indicator of which record types have been selected for logging. (GLOBAL, PROCESS, CLASS). |
| CPU THRESHOLD | The user selected value which must be crossed in CPU usage for a process to become "interesting". |
| DISC THRESHOLD | The user selectable value which must be exceeded in disc IO rate for a process to become "interesting". |
| RESPONSE THRESHOLD | The user selectable value which, if exceeded by a processes response time, makes it "interesting". |
| FIRST RESPONSE THRESHOLD | The user selectable value which must be exceeded by a processes time to first response to make it "interesting". |
| TRANSACTION THRESHOLD | The user selectable value which causes a process to become "interesting" by completing terminal transactions. |
| THINK TIME BUCKETS | The time values which define the number and limits of the transaction think time "buckets". |
| FIRST RESPONSE BUCKETS | The time values which define the number and limits of the transaction time to first response "buckets". |
| RESPONSE TIME BUCKETS | The time values which define the number and limits of the transaction response time "buckets". |
| DISC LDEVS | The number and logical device numbers for all configured disc devices. |

If WORKLOADS are begin logged, then the following information will be logged for each user defined class.

Class HEADER Metrics

| | |
|---|---|
| CLASS NUMBER | A unique number assigned by SCOPE to reference this class. |
| CLASS NAME | An eight character string assigned by the user to identify this class. |
| FILESETS | A list of the filesets (MPE Generic file names) which define the program files that comprise this class. |

APPEND. B

2  Data Collection

Scope collects performance information from several sources in the HP3000 system, but mainly from the HP3000 Measurement Interface. It augments Measurement Interface data from other sources when necessary.

Overview   This chapter describes Scope's data collection function. It discusses:

- Content of the Scope log files
- Product Dependencies
- Operations Issues
- Use of the collection program and configuration options
- HP3000 disc space requirements and data management considerations

Scope Log Files

The Scope Collector can log data into three different log files, depending on what types of information you wish to collect.

Global   GLOBAL information goes into the "Global" log file. It contains system wide measures such as CPU utilization and Disc IO rates. All processes on the system which contribute to these measures are reflected in the data.

While data may be sampled at higher rates to fit the need, normally one record is written to the Global log file every five minutes of system operation.

Process   PROCESS information goes into a separate "Process" log file. Each record in this file contains details about a particular process running on the system at a given point in time.

Process logs can be written once each minute. Since multiple processes can be active on the system each minute, not all processes are logged every sample. Instead, a process is logged only if it becomes "interesting".

A process becomes "interesting" (and gets logged) when:

- The process is first created
- The process terminates
- An existing process uses more than a user-configurable amount of critical system resources (like CPU or DISC)
- A process is receiving poorer response time than user configurable limits.

Workload  WORKLOAD information is the combination of many processes into a single "class".

You can select which processes to group into a workload class by entering a list of program file names for each class. (MPE Generic file names like @.@.HPOFFICE or SPOOK# are allowed in this list). You can also restrict the execution of programs to interactive only, batch only, or either.

Workload information summarizes resource consumption by all processes in a class and logs any activity once every five minutes. These records go into a "Workload" file.

USAGE NOTE

- Scope uses *three* log files for data collection, If you have to stop the Scope data collection and restart it at a later time, Scope will continue to use the same log files... adding records where it left off.

- As a log file is filled, data collection doesn't stop. Instead, the oldest 25 percent of the records in the file are removed to make room for new records. In this way you always have the most current information on your discs, and you don't have to worry about overflowing the log files.

- You can control how much history you keep on disc (and consequently how much disc space is required) by varying the size of each log file.

By setting the size of *each* of the three Scope log files, you have control over the history kept for each type of data collection. You will probably want to keep differing amounts of information depending on the log file type.

For example, you might want to keep 6 months of global data on line, but only 2 *weeks* of process data on line.

- One record of global data every 5 minutes doesn't consume substantial disc space, and you may often want to examine prior system-wide performance metrics.

- At a rate of multiple records each minute, the process records can accumulate quickly and consume significant disc space. Furthermore, interest in individual process executions most often declines over time.

Product Dependencies

The Scope data collection program runs on the HP3000. Minimum requirements for the system running the data collection portion of Scope include:

- An MPE V BASED HP3000 System running MPE version G.02.00 (UB-MIT) or later. (While SCOPE may work properly on previous versions of MPE, sufficient testing has not been performed to insure it.)

- The number of entries in the Process Control Block Table (PCB) must be configured to 628 or less. This is due to a current limitation in the Measurement Interface and may be removed in later releases of MPE.

The Scope data collection program will be installed into a special group, SCOPE.SYS, that will be built during the installation process. This group will contain the log files and other Scope programs and files.

The user running the Scope collection program will be SCOPE.SYS, and the logon group will be SCOPE.

Operations Issues

Stopping the Collector

The data collection job should be left running continuously. The only times you should stop it are when:

- You are preparing to shut down your system.

- You need to update the Scope package to a new release.

- You have made changes to the SCOPPARM parameters file and want them to take effect. (Changes to the parameters file only take effect when the collector is started).

- You are changing the size of a log file.

- You are performing a system backup and want to include the Scope log files.

You *may* perform system backups with the Scope collection job still running, but the Scope log files will not be included in the backup. (They are busy all the time.) If you RELOAD your system, you lose the contents of these log files unless they have been backed up.

There are three ways to stop the SCOPE collection job. The first is preferred.

1. Purge the file "RUN.SCOPE.SYS".

Each time the Scope collection program is run it creates a file called "RUN" in its logon group. Once a minute Scope will check to see if this file is still present. If not, Scope will terminate normally. *Normal* termination means that whatever remains in the collection job stream will then execute.

2. Abort the "SCOPEJOB" job stream. This technique does not provide as graceful a termination as option 1, but it will work.

3. By accident (e.g. a system failure or program abort).

Note  Scope flushes its file buffers to disc and updates the MPE file label on the log files after each sample. Since it protects itself in this way, you should not lose a significant amount of data in either case 2 or 3 above. The most data you should lose is the current sample (five minutes for GLOBAL and WORKLOAD data, one minute for PROCESS data).

Restarting the Collector

You must decide how Scope will be restarted after the system has been down or the Scope job is canceled. There are several options available to you:

- You can include the streaming of the file "SCOPEJOB" as part of SYSTART.PUB.SYS. It can be "streamed" each time the system comes up.

- You can build a logon UDC for OPERATOR.SYS that includes the streaming of SCOPEJOB.

- You can stream the job SCOPEJOB each time you wish to initiate the collector by including it in your own startup procedure that is executed each time the system comes up.

Whatever option you choose, you should ensure that the collector job is running at all times. You cannot examine system performance for any periods when the collector was not running.

Using the Collector

To initiate the Scope Collector on the HP3000, stream the job "SCOPEJOB.SCOPE.SYS".

You have the option, before you stream the job, to customize the collection process. You configure the collection program to collect the data you want, grouped in the ways you want to see it, and maintained for the time periods you desire.

The majority of the options for data collection are set through the use of a single ASCII parameters file called 'SCOPPARM'. (A sample SCOPPARM file is included with the SCOPE package but you will probably want to modify it to fit your own needs).

> If the "SCOPPARM" file is *not* found in the logon group when the SCOPE program is run, the defaults for each parameter will be used.

> If "SCOPPARM" is used, you only have to specify parameters you want to be different from the defaults.

> The order in which the parameters are entered into this file isn't important except that if a parameter is entered more than once, the last one is used.

> Syntax in this file is very forgiving and allows different formats to be used, if desired. For example, you can use any non alphanumeric character to separate keywords (Semicolons, commas, equal signs, or even blanks).

> To specify data collection options, create a file called 'SCOPPARM' in the SCOPE.SYS group. You can use almost any text editor you want as long as the result is a standard "flat" MPE file. You may use upper or lower case for all commands and parameters.

Configuration Options

The parameters for the SCOPPARM file are:

```
ID=systemid

LOG=[GLOBAL] [,WORKLOAD] ,[PROCESS[=ALL]]

THRESHOLD [CPU=percent]    [DISC=rate]
          [RESPONSE=seconds]   [FIRST=seconds]
               [TRANSACTIONS=count]

THINKRANGE= seconds [, ...]

FIRSTRANGE= second [, ...]

RESPRANGE= seconds [, ...]

CLASS= classname

FILE= filename [, ...]

INTERACTIVE= filename [, ...]

BATCH= filename [, ...]
```

Note  The SCOPPARM file may be commented. Any line starting with an asterisk (*) is ignored.

Descriptions of each parameter follow.

ID= systemid

A string of characters which will be used to identify your system. If you have multiple systems you should use different ID strings on each one. This identifier will be carried with the log files to the data presentation programs. You may enter a maximum of 40 characters for this parameter.

The default ID is all blanks.

LOG= [GLOBAL]

Specifying GLOBAL in the LOG command will cause global records to be written to the "SCOPELOG" file.

[,WORKLOAD]

Specifying WORKLOAD in the LOG command will cause workload records to be written to the "SCOPELOW" file.

[,PROCESS]

Specifying PROCESS in the LOG command will cause "interesting" processes to be written to the "SCOPELOP" log file.

[=ALL]

Specifying PROCESS=ALL in the LOG command will cause logging of any process which used any CPU time at all to be logged once each minute (whether it was "interesting" or not).

Specifying LOG= with none of the options will cause nothing to be logged. Any of the three log files will automatically be created if logging into them is specified and they do not already exist. If a particular type of logging is disabled, the corresponding log file will *not* be purged.

The defaults are LOG=GLOBAL,PROCESS

---

Caution  It is not recommended to use the LOG PROCESS=ALL setting. This can generate a very large number of process records each minute resulting in higher collection overhead and vastly increase disc space requirements.

---

THRESHOLD [CPU=percent]

This command sets the amount of CPU time which a process must exceed in order to become "interesting" and be logged. It is only used if Process logging is enabled. The value "percent" is a real number indicating overall CPU usage.

[DISC=rate]

This command sets the rate of DISC IO's which a process must exceed in order to become "interesting" and be logged. The value "rate" is the disc IO rate in transfers per second.

[RESPONSE=seconds]

This command sets the average terminal response time (from Inquiry to prompt) which a process must exceed in order to become "interesting" and be logged. The value "seconds" is a real number.

[FIRST=seconds]

This command sets the average time to first response (inquiry to first line written to the terminal) which a process must exceed in order to become "interesting" and be logged. The value "seconds" is a real number.

[TRANSACTIONS=count]

This command will cause any process which completed more than *count* transactions during a one-minute sample to become "interesting" and be logged. The value "count" is an integer number.

Defaults are:

```
THRESHOLD CPU=10.0,DISC=10.0,RESPONSE=5.0,FIRST=1.0,
    TRANSACTIONS=100
```

THINKRANGE= seconds [, ...]

This command sets the limits of terminal transaction *think time* "buckets" in the global log record.

There can be up to ten buckets. Each bucket counts the number of transactions which had think times less than the limit, and greater than the previous bucket's limit. The first bucket assumes a lower limit of zero seconds and the last bucket assumes an upper limit of infinity. Therefore, you can specify a maximum of nine non-zero numbers.

For proper operation, the numbers should form an increasing series of buckets. You may specify less than nine numbers if you want less than ten buckets.

The values "seconds" are real numbers allowing fractions of a second to be used, but the data collection program can't determine anything finer than one tenth of a second.

Default: THINKRANGE= 1, 2, 3, 4, 5, 10, 20, 30, 40 which sets up the following "buckets"

```
 0 to  1 second
>1 to  2 seconds
>2 to  3 seconds
>3 to  4 seconds
>4 to  5 seconds
>5 to 10 seconds
>10 to 20 seconds
>20 to 30 seconds
>30 to 40 seconds
>40 seconds
```

FIRSTRANGE= seconds [, ...]

This command sets the limits for the *time to first response* "buckets" in the global log file. These buckets function exactly like the think time buckets except they count the transaction's time to first response instead of think time.

Default: FIRSTRANGE= 0.5, 1.0, 1.5, 2, 3, 4, 5, 10, 20

RESPRANGE= seconds [, ...]

This command defines the limits for the *response time* "buckets" in the global log file. These buckets work the same way as the think time buckets except that they count the transaction's time to prompt instead of it's think time.

Default: RESPRANGE= .5, 1, 1.5, 2, 3, 4, 5, 10, 20

CLASS= classname

This command defines a "class" which will group multiple program files together and report on their combined activities.

The CLASS= command must preceed any FILE=, INTERACTIVE=, or BATCH= commands since they all refer to the last CLASS= command encountered in the "SCOPPARM" file. The value "classname" is a string of up to 20 characters which will be used to identify the class.

Default: There is one predefined workload called "OTHER" which will collect all processes not defined in another "class" in the SCOPPARM file.

FILE= filename [, ...]

This command specifies which program files belong to a "class". It applies to the last CLASS= command issued. An error is generated if no CLASS= command is found in the SCOPPARM file.

*filename* may be a simple fully qualified MPE file name

Example: EDITOR.PUB.SYS or a generic file name

Example: VOODOO#.@.@ or a partially qualified file name

Example: SPOOK5 in which case all groups and all accounts is assumed. i.e. SPOOK5.@.@

Multiple filenames may be entered on the same command line (separated by commas), or in separate FILE= commands.

INTERACTIVE= filename [, ...]

This command is the same as the FILE= command except that it signifies that only *interactive* executions of this program are to be considered as belonging to the class.

BATCH= filename [, ...]

The BATCH= command is the same as the FILE= command except that it signifies that only *batch* executions of a program (jobs) are to be included in the class.

Note  Any combination of FILE=, INTERACTIVE=, and BATCH= commands may be used in a given class if desired. All such commands will apply against the last CLASS= workload definition.

Example of defining workloads:

```
CLASS=Interactive Editors
INTERACTIVE=EDITOR.PUB.SYS, QEDIT.@.@

CLASS=Compilers
FILE=COBOL@.PUB.SYS
FILE=FORTRAN.PUB.SYS,FTN@.PUB.SYS
FILE=PASCAL.PUB.SYS, SPL.PUB.SYS, RPG.PUB.SYS
FILE=BASICOMP.PUB.SYS, HPBBCMP.PUB.SYS
BATCH=BASIC.PUB.SYS, HPBB.PUB.SYS
```

Setting the disc space requirements:

There are two ways to decide how big to build the SCOPE Log files. The analytic way, and the easy way.

1. The *easy* way...

Let Scope create the log files with the default sizes. Collect data for as long as you want to maintain a history on your system. (This may differ depending on the log record type, so you may have to do this independently on each of the three log files).

As the time passes, keep an eye on the log files by doing a :LISTF,2 and make sure they aren't getting close to overflowing. (This would only be the case on a VERY busy system since the default log file sizes are fairly large). The best indicator of how full the log files are is the number of extents allocated. (They are all variable length record files so the EOF versus the File Limit won't tell you much).

If a file is filling up too fast and you want to expand it, follow these steps:

- Stop the collector job

The easiest way to stop the Collector is to purge the file "RUN.SCOPE.SYS".

- Create the new, larger file:
  ```
  :FILE NEWLOG;DISC=newcapacity
  :FCOPY FROM=oldlog;TO=NEWLOG;NEW
  :PURGE oldlog
  :RENAME NEWLOG,oldlog
  ```

- Start the collector job again.

Note  It is important to use the ;NEW option with FCOPY since each log file contains a user label which must be preserved.

Once the desired interval has passed and a log file contains the amount of history you want to maintain (the disc space requirements are proper), then you can shrink away any excess file space using the above technique and base the new capacity on the number of file extents used so far.

2. The *analytic* way...

If you can determine the number of log records you want to hold in each log file:

- multiply the number by the size of each record

You can use this product to arrive at a size to use for each Scope log file in advance. Once this size is determined, you can set a file equation to override the default sizes the first time the Scope program is run and it will create log files this size.

If you desire to take this approach, here are some numbers you will need:

Table 2-1. Log Record Sizes: (all values are in 16 bit words)

| | |
|---|---|
| Global Header Records | 73 + the number of configured disc drives on the system |
| Workload Header Records | 17 + (enough words to hold the fully qualified filenames + 1 per filename up to a maximum of 68 words) |
| Global Records | 71 + 7 times the number of configured disc drives on the system |
| Workload Records | 32 + 2 times the number of configured disc drives on the system |
| Process Records | 58 |

Log record Frequencies:

Table 2-2. Global Log File (SCOPELOG)

| One | Global Header record each time the SCOPE collection program is run. |
|---|---|
| One | Global Record every five minutes |
| Zero to three | Special Workload Records every five minutes |

Table 2-3. Workload Log File (SCOPELOW)

| One | Global header record each time the SCOPE collection program is run. |
|---|---|
| One | Workload header record for each defined workload each time the SCOPE collection program is run. |
| One | Workload record every five minutes for any workload which was active during the interval. |

Table 2-4. Process Log File (SCOPELOP)

| One | Global Header record each time the SCOPE collection program is run. |
|---|---|
| One | Process record every minute for every "interesting" process (unless option PROCESS=ALL in which case one process record every minute for every process which consumed any CPU time at all). |

Add one word to each record to hold the variable record length word, add it all up and you get the number of words large the file needs to be. Divide this number by the file block size (4094).

This is the capacity you use in the file equations:

```
:FILE SCOPELOG;DISC=globalcapacity
:FILE SCOPELOW;DISC=workloadcapacity
:FILE SCOPELOP;DISC=processcapacity
:RUN SCOPE
```

Data Management Considerations

Please give us feedback on file or space management problems... we'll use the feedback to build this part of the manual.

3  Data Extraction and Transfer

You can access and view performance data with the *MicroScope* PC program only after performance data has been extracted from the raw Scope log files and transfered to a disc accessible by MS-DOS. This is a two-step procedure:

1. Run an HP3000 program to extract performance measurement data from the raw Scope log files and create a PC-type file on the HP3000.

2. Run *AdvanceLink* to transfer the PC-type file to a disc that is recognized by MS-DOS.

This chapter describes Scope's data extraction capabilities, and discusses methods to perform data transfer. It is structured as a reference guide.

Overview  The functions described in this chapter are:

- Extraction of Data: Description of extraction options and use of the HP3000 extraction program "SCOPEXPC".

- Transfer of Data: Description of transfer options and use of HP's *AdvanceLink*.

Included in this chapter are some suggestions for efficient management of Scope log files on the HP3000 and PC discs.

Extraction of Data

The extraction process reads performance measurement data that has been collected by Scope and creates a file that is optimized for access by the PC program *MicroScope*.

The options you choose when extracting data will impact the view that *MicroScope* will have when you draw graphs.

You choose options to limit or "filter" the performance measurement data which is extracted. You tailor the PC-optimized output file by providing:

- The range of dates to be included in the extracted file.

- Whether or not you wish to include weekend data in the extracted file.

- The hours of the day to be included in the extracted file.

- The type of logfile records to extract.

The extraction options help you achieve disc storage and file transfer economies. If you choose not to limit your extraction you may incur unnecessary costs.

If, for example, system performance measurements from early morning hours or weekends are not relevant, you may eliminate those periods from the extracted file and save disc space and file transfer time.

For a more detailed discussion of the relationship between raw log files and extracted log files, and the impact of extraction choices on the presentation of graphs, please refer to tutorial session 4, *Adjusting the focus on your Scope*, in chapter 1 of this manual.

Using the extract program  The extract program SCOPEXPC, which runs on the HP3000, extracts Scope logfile data and creates a PC-optimized logfile on the HP3000.

To run the extract program, we recommend that you log on to the SCOPE.SYS group (where the Scope log files exist) as the user SCOPE. You may log on as another user, but this user should have at least IA and SF capabilities.

There are three basic options for running the extraction program. They are:

1. Run SCOPEXPC and "manually" specify extraction constraints.
2. Run SCOPEXPC.AUTO and "automatically" specify extraction constraints.
3. STREAM one of the batch files that we provide to perform the extraction.

OPTION 1.

- Log on to the HP3000 as the user SCOPE in the SCOPE.SYS group and run the program SCOPEXPC.

:RUN SCOPEXPC

If the file "SCOPEPC" exists in the logon group you will be asked if you want to PURGE it.

- If you answer "yes" the existing file will be purged and a new on created.
    - If you answer "no" then the data you extract will be *appended* to the end of the existing file.

If the file "SCOPEPC" does not exist in the logon group, a new one will be created.

- Respond to the prompts from the extract program. Prompt and response options are listed in table 3.1 on the following page.

USAGE NOTE

You can supply a "number of days" parameter to SCOPEXPC when you run it. (i.e. :RUN SCOPEXPC;PARM=nnn ) The number of days (nnn) you specify will determine the *default* for the "first date to be extracted" in the extract dialog.

Table 3-1. Extract prompts

| Prompt | Response |
|---|---|
| ENTER THE FIRST DATE TO BE EXTRACTED | Type the first date to be extracted & press (Return). To take default (in parenthesis): (Return) only. |
| ENTER THE LAST DATE TO BE EXTRACTED | Type the last date to be extracted & press (Return). To take default (in parenthesis): (Return) only. |
| DO YOU WANT TO SKIP WEEKENDS (N/Y) ? | Type Y or N and press (Return). N is the default. |
| ENTER FIRST TIME OF EXTRACTION WINDOW | Type the hour your "system day" starts & press (Return). To take default (in parenthesis): (Return) only. |
| ENTER LAST TIME OF EXTRACTION WINDOW | Type the hour your "system day" ends & press (Return). To take default (in parenthesis): (Return) only.<br><br>The "last" time must be greater than the "first" time or no data will be extracted. |
| EXTRACT GLOBAL RECORDS (Y/N) ? | Type Y & press (Return). Global records provide data for the *MicroScope* Global graph functions. |
| EXTRACT CLASS RECORDS (Y/N) ? | Type N & press (Return). Not used by *MicroScope* at this time. |
| EXTRACT PROCESS RECORDS (Y/N) ? | Type N & press (Return). Not used by *MicroScope* at this time. |

OPTION 2.

Run the "SCOPEXPC" program in "automatic" mode

:RUN SCOPEXPC,AUTO

No prompt/response dialog will take place. The program will extract data according to the following rules:

A. If a valid SCOPEPC file aleady exists...

- extracted data will be appended to the file

- the "first date to be extracted" will be determined by where the previous extract to the existing SCOPEPC file left off. It will be set to the "latest" date and time in the SCOPEXPC file.

Note  If you run SCOPEXPC.AUTO with ;PARM=nnn the "first date to be extracted" will be *nnn* days before the end of the raw Scope log files' latest date.

- the "last date to be extracted" will be determined by the end of the raw Scope log files. It will be set to the "latest" date and time in the raw files.

- All other extraction constraints will default to the way they were specified the *last* time you ran the SCOPEXPC program against the extract file.

B. If a valid SCOPEPC file *does not* exist...

- a new file will be built

- the "first date to be extracted" will be set to 30 days before the latest date in the raw Scope log files *or* at the earliest date in the raw log files if there are less than 30 days of data there.

If you run SCOPEXPC.AUTO with PARM=nnn, the first date will be *nnn* days (maximum) before the latest day in the raw data.

- the "last date to be extracted" will be set to the latest date and time in the raw Scope log files.

- options for limiting extracted data will be set to include weekends, use a full (24 hour) day, and extract GLOBAL records only.

OPTION 3.

Use the two batch files that are provided in the SCOPE.SYS group to perform an extract.

HP3000 Batch Files:

- The batch file "SCOPEEX1" will PURGE the "SCOPEPC" file, run the extract program and create a new "SCOPEPC" file. This job uses "default" values.

- The batch file "SCOPEEX2" will run the extract in AUTO mode and append data to the SCOPEPC file.

You can edit the files to tailor the extraction constraints to your own needs.

The jobs can be "STREAMED" with the "AT=hh:mm" parameter to run at an off hour and have your extracted data ready whenever you need it.

USAGE NOTES

1. You can run the extract program from a logon group and account other than SCOPE.SYS. We don't recommend this, but if you do you will need to set up file equations which allow you read access to the log files. The files you will need access to are SCOPELOG, SCOPELOP, and SCOPELOW. Examples of file equations:

```
   :FILE SCOPELOG=SCOPELOG.SCOPE.SYS
   :FILE SCOPELOP=SCOPELOP.SCOPE.SYS
   :FILE SCOPELOW=SCOPELOW.SCOPE.SYS
   ```

If you run the extraction program from various groups on the system, please pay attention to the location of the file "SCOPEPC". If the last version of that file is not in your logon group a new one will be created. You can, of course, use a file equation to point to a central SCOPEPC file.

2. The latest options you choose (to limit the amount of extracted data) are stored in the SCOPEPC extraction file. You may want to create multiple extract files, each with different names and options selected. You can then run multiple automatic extracts (with only a change in a file equation) and append compatible data to each one.

3. By default, new SCOPEPC files are created with a size based on the amount of data available in the source Scope log files. You may override this selection by entering a file equation prior to the creation of the file:

:FILE SCOPEPC;DISC=nnn where "nnn" is the number on 1K Byte blocks to allow. The maximum size allowed on this file is 32767 blocks.

Transfer of Data

For the initial Alpha release of Scope, we recommend the use of *AdvanceLink* to transfer the file "SCOPEPC" to a PC disc. You may run AdvanceLink and issue commands of your own to download the extraction file, "SCOPEPC.SCOPE.SYS", to the PC. Transfer it as a "binary" file.

A more automated option is provided to allow you to combine the extraction and transfer steps. In the installation procedure, an AdvanceLink command file ("SCOPEXFR.BAT") was copied to the ADVLINK directory on your PC's hard disc. This command file, when executed through AdvanceLink will do the following:

- Log on to the HP3000 as SCOPE.SYS,SCOPE.

No passwords are included in the command file. You must edit the file to provide your own passwords. (See the comments in the file.)

- Purge the file SCOPEPC.SCOPE.SYS if it exists.

- Run the SCOPEXPC extraction program with ",AUTO;PARM=1" specified.

This will extract all logfile data from all of yesterday and up to the time the job is run today.

- Download the new "SCOPEPC.SCOPE.SYS" file to the PC and create a new file called "SCOPEPC.PRF" in the SCOPE directory.

Caution 

No renaming of the old files will occur. If a "\SCOPE\SCOPEPC.PRF" file exists, it will be replaced without a warning.

The AdvanceLink command file may be edited to suit your needs.

USAGE NOTES

1. Using AdvanceLink, the approximate transfer time for 30 days of GLOBAL data is 20 minutes (at 9600 baud).

2. If you have Resource Sharing and can use the HP3000 disc as a shared MS-DOS disc, you can run Resource Sharing's file convert utility, "FILECONV", to accomplish this "transfer" function in much less time.

FILE CONV. PPL.

Data Management

Please give us feedback on file or disc management problems and techniques you use to keep a handle on your logfiles.

I claim:

1. A performance and measurement system for a multi-process computing system, the performance and measurement system measuring performance of the computing system, and the performance and measurement system comprising:

performance data production means embedded within an operating system of the computing system for producing performance data about individual processes running on the computing system;

at least one data file; and data collection and reduction means, coupled to the performance data production means and to the at least one data file, for receiving the performance data, reducing the performance data by combining selected data from the performance data pertaining to the individual processes into standardized metrics to produce reduced data which pertains to groups of the individual processes, discarding the performance data and logging the reduced data into the at least one data file, wherein the performance data is never logged.

2. A performance and measurement system as in claim 1 wherein the at least one file includes:

a global data file into which data collection and reduction means logs information about the computing system as a whole;

a process data file into which data collection and reduction means logs information about selected processes selected by the data collection and reduction means; and, a workload data file into which data collection and reduction means logs information about the groups of the individual processes.

3. A performance and measurement system as in claim 1 additionally comprising:

a user workstation; and, transport means, coupled to the at least one data file and to the user workstation for delivering data logged within the at least one data file to the user workstation.

4. A method for performance and measurement evaluation of a computing system, the method comprising the steps of:

(a) producing by the operating system of the computing system initial performance data about individual processes running on the computing system;

(b) collecting and reducing the initial performance data by combining selected data from the performance data into standardized metrics to produce collected and reduced performance data which pertains to groups of the individual processes;

(c) logging the collected and reduced performance data into at least one data file; and, (d) discarding the initial performance data, wherein the initial performance data is discarded without ever having been logged.

5. A method as in claim 4 wherein step (c) includes the substeps of:

(c1) pertaining to the groups of individual process into a workload data file.

6. A method as in claim 4 additionally comprising the step of:

(e) presenting the collected, reduced and logged performance data to a user workstation for storage in a form accessible to a user.

7. A method as in claim 4 additionally including the step of:

(e) producing standard process metrics from raw process data for processes which, during a specified interval, are started, processes which during the specified interval are terminated, and processes which during the specified interval use at least a predetermined amount of a given resource of the computing system.

8. A method as in claim 7 additionally comprising the steps of:

(e) logging information about the computing system as a whole into a global data file; and (f) logging the standard process metrics produced in step (e) into a process data file.

* * * * *